Jan. 30, 1968　　　　J. W. ROBINSON　　　　3,366,854
PEST REPELLING APPARATUS AND METHODS
Filed April 21, 1965　　　　　　　　　　　　2 Sheets-Sheet 1
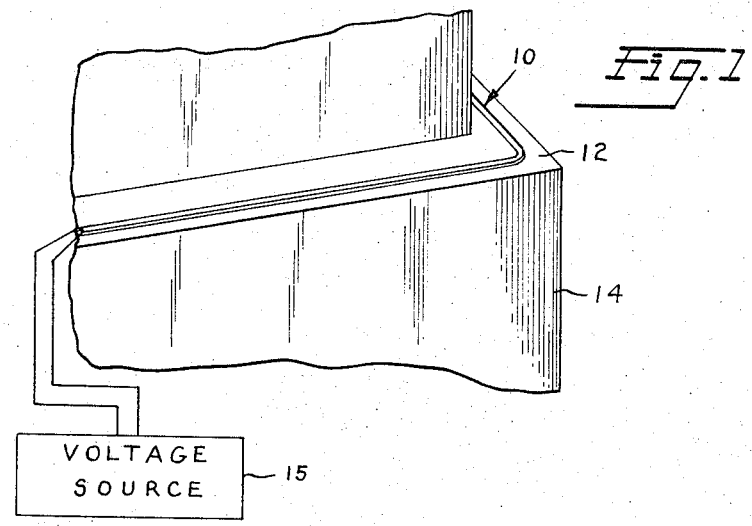
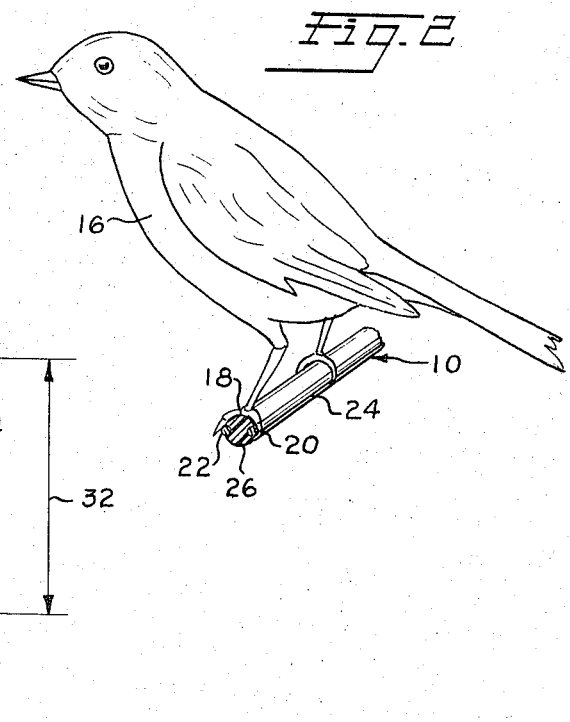
INVENTOR
JOHN W. ROBINSON
BY Strauch, Nolan & Neale
ATTORNEYS Jan. 30, 1968   J. W. ROBINSON   3,366,854
PEST REPELLING APPARATUS AND METHODS
Filed April 21, 1965   2 Sheets-Sheet 2
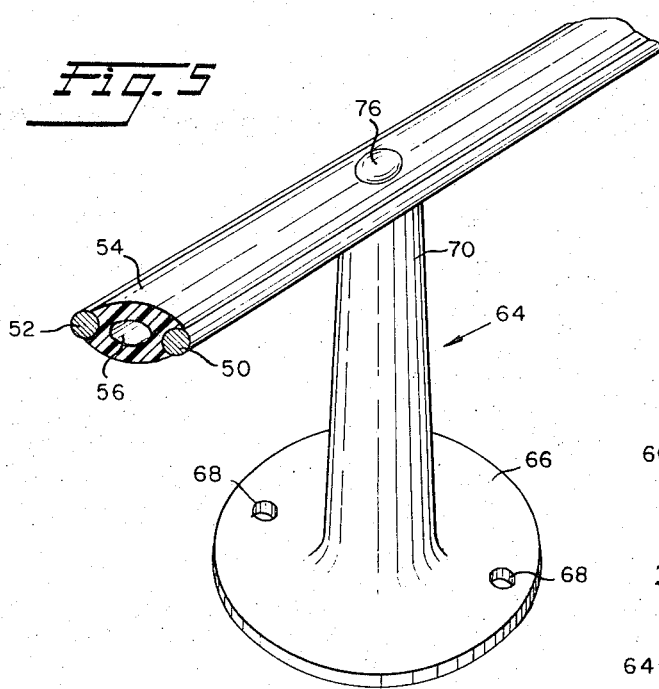
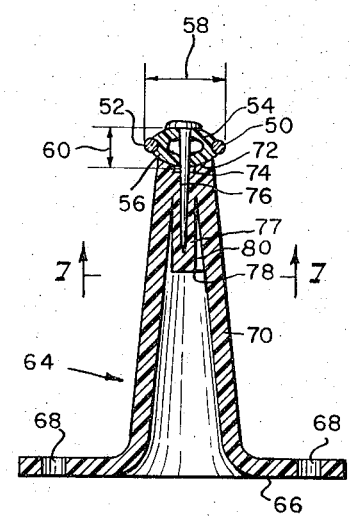
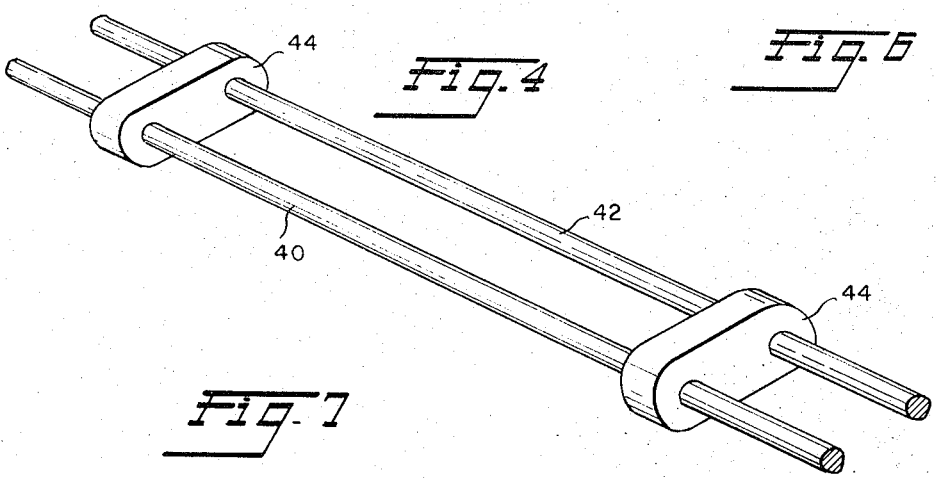
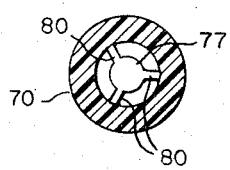
INVENTOR
JOHN W. ROBINSON
BY
Strauch, Nolan, Neale, Nies & Bronaugh
ATTORNEYS United States Patent Office 3,366,854
Patented Jan. 30, 1968

3,366,854
PEST REPELLING APPARATUS AND METHODS
John W. Robinson, Dighton, Kans., assignor to Charles A. Cowsert, Council Grove, Kans.
Continuation-in-part of application Ser. No. 307,151, Sept. 6, 1963. This application Apr. 21, 1965, Ser. No. 451,689
5 Claims. (Cl. 317—262)

This application is a continuation-in-part of my copending application Ser. No. 307,151, filed Sept. 6, 1963, now abandoned.

This invention relates to apparatus and methods for electrically repelling pests from areas in which they are not wanted and more particularly to apparatus and methods for repelling birds from building ledges, roofs, and the like which serve as perches and roosts.

In many areas starlings, pigeons or other birds congregate at roosts on buildings or other suitable structures. Such congregations of birds are undesirable because of the noise which the birds create and because of their droppings.

In prior art attempts to repel birds from such roosts, pulse type high voltage electric equipment has been utilized to electrically shock, without killing, the birds. As shown in United States Letters Patent No. 2,647,228 to Just, the conductors of such electric equipment have been strung along the building in proximity to the position the birds occupy when perched. A relatively large spacing between conductors was provided and a pulse type high voltage power source was used to cause a spark or an electric field to traverse the space between the conductors where the birds perched. This spark or field is intended to transmit current through the main body parts of the bird where, however, vital organs may, upon occasion, be fatally injured. Also, the prior art devices present a certain degree of difficulty of installation and possible fire hazard.

Accordingly, the primary object of the present invention is to provided an electric pest repelling installation which obviates the foregoing disadvantages of the prior art structures.

To accomplish this objective, a pair of electrical conductors, formed as a cable with surface portions of both conductors exposed, are positioned in the area to be cleared of pests in such manner as to ensure that the pest will bridge the two conductors which are supplied with a suitable voltage to produce an unpleasant sensation to the pest.

In a bird repelling installation, the conductors are provided at opposite sides of a cable which is preferably made of a suitable plastic insulating material. The cable is cross-sectionally dimensioned so that when installed on or perhaps slightly above a roosting surface, birds prefer to perch on the elevated ridge presented by the cable rather than on the perching surfaces of the building. With the conductors on horizontally opposite sides of the cable, opposed digits of at least one of the bird's feet will be in direct contact with the two conductors at their different voltages, and the current path through the bird is then primarily through the foot of the bird between the conductors rather than through its body. Because of the construction of the present invention, actual contact between one part of the body of the bird and both electric conductors is achieved and therefore, a lower voltage across the conductors, which can be better controlled, will be sufficient to shock and frighten without killing the birds.

Accordingly, other objects of the present invention include:

(1) The provision of novel, improved pest-repelling methods and structures incorporating a pair of electrical conductors arranged to be bridged by one extreme portion of the body of a pest;

(2) The provision of improved, novel bird-repelling cables, especially sized to serve as a perch and having a pair of exposed conductors adapted to contact apposite digits of a bird's foot whenever the bird uses the cable as perch; and (3) The provision of improved bird-repelling installations on buildings capable of utilizing lower voltages so as to obviate dangers of fire, electric shock to humans, and electrocution of the birds.

These and other objects of the present invention will more fully appear from the following description and appended claims when read in conjunction with the accompanying drawings wherein:

FIGURE 1 is a perspective fragmentary view of a bird roost on a building with the repeller cable of the present invention installed thereon;

FIGURE 2 is perspective view of the repeller cable of FIGURE 1 and shows a bird perched thereon;

FIGURE 3 is a transverse section of one embodiment of a cable that may be used in the system of FIGURE 1;

FIGURE 4 is a pictorial view of a second embodiment of a cable that may be used in the system of FIGURE 1;

FIGURE 5 is a pictorial view of a further form of cable shown mounted on a novel support post adapted for supporting a cable above the ledge on a building;

FIGURE 6 is a front elevation in section of FIGURE 5; and

FIGURE 7 is a bottom view in section of the support post taken along line 7—7 of FIGURE 6.

As seen generally in FIGURE 1, repeller cable 10 of the present invention is installed along a roosting ledge 12 of a building 14 and is connected to a suitable source of operating voltage 15. The cable may be laid directly on the ledge or may be supported in a position spaced slightly thereabove by suitable mounting arrangements, such as with the support posts as illustrated in FIGURES 5 and 6, placed at intervals along the cable. In either case, the cable is of sufficient size that it presents a convenient and attractive elevated perching surface for birds on the ledge and particularly for birds just alighting there from flight.

As shown in FIGURE 2, a bird 16 perched on cable 10 grasps the cable on its opposite sides with apposite digits 18 and 20 of at least one foot which thus make contact with exposed portions of conductors 22 and 24 partially embedded in insulating material 26 of cable 10.

As shown more clearly in FIGURE 3, insulating material 26 encompasses approximately two-thirds of the periphery of conductors 22 and 24 in the embodiment illustrated and thus firmly retains the conductors in the insulating material to form a unitary cable structure. In this specific embodiment, wherein the cable is to be employed in repelling birds, representative cable dimensions may be as follows: The width 30 of the cable may be approximately 10 to 20 millimeters; the height 32 may be approximately 6 to 16 millimeters; embedded conductors 22 and 24 (which may have cross-sectional shape other than circular) may have exposed widths 36 of approximately 2 to 7 millimeters; and the conductors are internally separated by insulating material 26 by a distance 34 which may be approximately 7 to 10 millimeters. The foregoing dimensions are such that each foot of a bird that perches on the cable will contact both conductors of the cable.

The cable 10 may be formed by any suitable manufacturing process such as extruding the insulating material around the conductors, or alternatively, the conductors may be resiliently pressed into retaining recesses in a preformed insulating body. Also, it may be desirable to provide an adhesive material between the conductors and the insulating material to secure the conductors therein.

Referring now to FIGURE 4, a cable construction is illustrated which comprises a pair of single strand copper wires 40 and 42 which are totally exposed except at points of separation where spacers 44 of insulating material are positioned. The distance between the spacers 44 depends upon the stiffness of wires 40 and 42, but may be on the order of 3 to 6 inches. Spacers 44 should be sufficiently small so that the pest does not use the spacer as a perch. Spacers 44 may be placed on the ledge 12 of a building (see FIGURE 1) where birds habitually perch and secured in place by means of an adhesive or other suitable anchoring hardware.

Turning now to FIGURES 5 and 6, there is illustrated a third embodiment of the cable wherein the two wires 50 and 52 are part of a cable that is formed with a body 54 of insulating plastic material that has a hollow core 56. The cross-section of this cable is somewhat elliptical with dimension 58 being about six millimeters and distance 60 being about twelve millimeters.

This cable is adapted to be mounted on a support post 64 of insulating material as illustrated in FIGURES 5 and 6. Support post 64 is molded of a plastic insulating material that is weather resistant and has a lower surface 66 which is adapted to be located on any roof surface or on ledges on the building to be protected as by fasteners (not shown) through holes 68. A thimble shaped center section 70 serving as a stem portion extends upwardly to an upper surface 72 which may be curved slightly to fit the contour of and serve as a cradle for the body 54 of insulating material of the cable when mounted as illustrated in FIGURE 6.

At the center of upper surface 72 a circular recess 74 is provided which serves as a guide for receiving the tip of nail 76 and centering nail 76 in post 64. A cylindrical body 77 having a diameter approximately equal to that of recess 74 is provided to receive the entire length of nail 76. Body 77 is anchored to the outer wall portion of thimble 70 as by webs 80 (see FIGURE 7) which extend to lower surface 78 (see FIGURE 6) of cylindrical body 77.

When nail 76 is driven through surface 74 and into body 77, body 77 can expand radially to firmly grip the surface of nail 76 without exceeding its elastic limit. By using a nail having a spiral shaped projecting ridge (not shown) on its outer surface, the nail is firmly anchored in post 64 to thereby permanently secure cable body 54 to post 64.

One of the important advantages resulting from the use of a cable having a hollow core is that nail 76 can be driven through the insulation material easier than if a solid core is used. This is a significant consideration when it is recognized that nails 76 can be driven through the cable only after support posts 64 are all secured in place and thus this operation must be performed by workmen frequently suspended at the edge of the roofs and ledges on multistory buildings. For a similar reason, the recess at 74 is of comparable importance to be certain nail 76 becomes properly located when it is driven in support post 70.

Another important factor is that the cable must be held tightly on the upper surface 72 of support so that water or moisture cannot accumulate and tend to loosen nail 76 as a result of freezing and thawing. For this reason, the diameter of recess 74 is made about the same size as the diameter of nail 76. The sides of nail 76 may advantageously be roughened as by use of spiral ridges to increase its holding power in the body of support post 64 as mentioned above.

The cable of the present invention thus may be installed on any type of material on a building to be protected by mounting it with suitable attachments on or slightly above the building roosting surface. For narrow ledges a single cable may suffice to prevent roosting, but for larger roosting surfaces, it may be necessary to utilize a plurality of parallel cables or a crossed network of cables to fully protect the area. In bending the cable during installation, heat may be applied to make the insulating material cable more pliable.

The cable is adapted for connection to any suitable electric power source 15 such as is conventionally used with electric fences or other pest repelling systems.

Insulating materials for the cable or support may be chosen from any suitable material preferably having the following properties: electrically insulating, moisture resistant, fire proof, resilient, resistant to deterioration by weathering, pliable by heating, and heat resistant. Electric conductors 22 and 24 may be made of any suitable material preferably possessing the following properties: high electric conductivity, pliable under added heat, oxidation resistant, and resistant to the formation of insulating surface scales or deposits.

The repeller cable according to the principles of the present invention may have a circular shape or oval cross-section which, for example, may more specifically be elliptical, egg shaped, oval or rectangular with rounded corners, or be of open wire construction as shown in FIGURE 4. An oval shaped cable as illustrated in FIGURE 6 is preferably installed with its major cross-sectional axis horizontal. The shape of the cable of the present invention is selected to allow for easy installation and to accommodate the feet of the particular species to be repelled.

In installations desired to repel pests other than birds, the cable would be designed to achieve an electric bridge through an extremity of the specific pest to be controlled in accordance with the anatomy and habits of the pest and the principles of the present invention. Three or more conductors may in some cases be used. In certain installations total exposure of electrical conductors except at the points of attachment, may also be feasible as long as the conductors are maintained in such a position as to be bridged by a pest.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An installation for repelling birds from a roosting surface comprising:
    a source of electrical power;
    a unitary electrical cable comprising a pair of spaced apart longitudinal conductors separated by an elongated body of insulating material therebetween, the cross-sectional dimensions of said cable being such that the cable is utilizable as a perch for birds, an elongated surface on each of said conductors being free of covering insulating material to be exposed along a major portion of the length of said cable, the spacing between the exposed portions of said conductors being such as to always provide a current path primarily through a foot of a bird perched on said cable because of simultaneous contact between each conductor and apposed digits on the single foot of the bird;
    means for supporting said conductors in a substantially horizontal plane to promote the simultaneous contact between each conductor and apposed digits on a single foot of a bird perched on said cable; and
    means connecting said conductors to said power source.

2. The installation as defined in claim 1 wherein said support means comprises a lower surface adapted to be rigidly mounted on said roosting surface, an elongated stem portion extending upwardly from said lower surface, an upper surface connected to said stem portion and formed to cradle a peripheral portion of the insulating material of said cable, and means for securing said cable to said upper surface in such manner as to prevent water from accumulating between the support means and the cable.

3. The installation as defined in claim 2 wherein said stem portion of the support means comprises a hollow frustoconical member having inner walls, an inner cylindrical body portion of a resilient plastic material integrally connected at one end of said stem portion and supported by thin webs connected to the inner walls of said stem portion for receiving a portion of said securing means.

4. The installation as defined in claim 3 wherein said conductors are imbedded in said insulating material with a major peripheral portion of their cross sections encompassed by said insulating material to unitarily retain said conductors therein and with a minor peripheral portion from about 2 to 7 millimeters exposed, said cable having cross-sectional dimensions from about 10 to 20 millimeters wide and 8 to 16 millimeters high.

5. The installation as defined in claim 3 wherein said cable comprises a continuous body of insulating material having a hollow central core extending the length of the cable, the conductors being mounted so that the shortest distance between the centers of the conductors lies along a substantially horizontal line, and said securing means comprises a nail-like fastener adapted to extend through said insulating material and said hollow core and into said inner cylindrical body of said stem portion.

References Cited

UNITED STATES PATENTS

| 3,294,893 | 12/1966 | Shaffer | 174—70 |
| 2,619,553 | 11/1952 | Kroeckel | 174—97 X |
| 2,647,228 | 7/1953 | Just | 317—262 |
| 2,927,952 | 3/1960 | Wermine. | |

FOREIGN PATENTS

| 1,051,560 | 2/1959 | Germany. |
| 752,998 | 7/1956 | Great Britain. |
| 764,151 | 12/1956 | Great Britain. |
| 135,179 | 4/1952 | Sweden. |

OTHER REFERENCES

T.V. Lead-In Spacers, Modern Plastics, page 182, October 1951.

LEE T. HIX, *Primary Examiner.*